United States Patent
Mangal et al.

(10) Patent No.: US 10,676,103 B2
(45) Date of Patent: Jun. 9, 2020

(54) OBJECT POSITION HISTORY PLAYBACK FOR AUTOMATED VEHICLE TRANSITION FROM AUTONOMOUS-MODE TO MANUAL-MODE

(71) Applicant: Aptiv Technologies Limited, St. Michael OT (BB)

(72) Inventors: Nandita Mangal, Palo Alto, CA (US); Michael H. Laur, Mission Viejo, CA (US)

(73) Assignee: Aptiv Technologies Limited (BB)

( * ) Notice: Subject to any disclaimer, the term of this patent is extended or adjusted under 35 U.S.C. 154(b) by 151 days.

(21) Appl. No.: 16/030,278

(22) Filed: Jul. 9, 2018

(65) Prior Publication Data
US 2019/0351916 A1 Nov. 21, 2019

Related U.S. Application Data
(60) Provisional application No. 62/672,815, filed on May 17, 2018.

(51) Int. Cl.
*B60W 50/14* (2020.01)
*G06F 16/738* (2019.01)
*G06F 16/78* (2019.01)

(52) U.S. Cl.
CPC .......... *B60W 50/14* (2013.01); *G06F 16/739* (2019.01); *G06F 16/7867* (2019.01); *B60W 2050/146* (2013.01)

(58) Field of Classification Search
CPC ............. B60W 50/14; B60W 2050/146; G06F 16/739; G06F 16/7867
See application file for complete search history.

(56) References Cited

U.S. PATENT DOCUMENTS

| | | | | |
|---|---|---|---|---|
| 8,676,431 B1 * | 3/2014 | Mariet | ................ | G05D 1/0238 701/28 |
| 2012/0133769 A1 * | 5/2012 | Nagamine | ................ | B60R 1/00 348/148 |
| 2013/0116887 A1 * | 5/2013 | Tieman | ................ | G08G 1/166 701/36 |
| 2014/0046550 A1 * | 2/2014 | Palmer | ................ | G11B 27/105 701/48 |

(Continued)

OTHER PUBLICATIONS

European Search Report for Application No. 19173297.3, European Patent Office, dated Oct. 16, 2019.

*Primary Examiner* — Courtney D Heinle
(74) *Attorney, Agent, or Firm* — Joseph V. Bonadies

(57) ABSTRACT

A system for operating an automated vehicle includes a perception-sensor, a display, and a controller-circuit. The perception-sensor is used to determine a rendering of an area proximate to a host-vehicle. The display is operable to convey to an operator of the host-vehicle a position of an object present in the area in accordance with the rendering. The controller-circuit is in communication with the perception-sensor and the display. The controller-circuit is configured to operate the host-vehicle in an autonomous-mode, and operate the display to convey to the operator a history of the position of the object in accordance with the rendering. The history is conveyed in response to initiating a transition of operation of the host-vehicle from the autonomous-mode to a manual-mode.

12 Claims, 3 Drawing Sheets

(56) References Cited

U.S. PATENT DOCUMENTS

| | | | |
|---|---|---|---|
| 2015/0081156 A1* | 3/2015 | Trepagnier | G01S 17/931 |
| | | | 701/26 |
| 2017/0036673 A1* | 2/2017 | Lee | G06F 3/017 |
| 2017/0305365 A1* | 10/2017 | Matsumoto | B60R 16/02 |
| 2018/0024354 A1* | 1/2018 | Shibata | G08G 1/16 |
| | | | 345/7 |

* cited by examiner

OBJECT POSITION HISTORY PLAYBACK FOR AUTOMATED VEHICLE TRANSITION FROM AUTONOMOUS-MODE TO MANUAL-MODE

TECHNICAL FIELD OF INVENTION

This disclosure generally relates to a system for operating an automated vehicle, and more particularly relates to a system that operates a display to playback or convey to an operator a history of the position of an object when a transition is initiated to change operation of the host-vehicle from an autonomous-mode to a manual-mode.

BACKGROUND OF INVENTION

When an automated host-vehicle transitions from an autonomous-mode to a manual-mode where an operator of the vehicle takes manual control of some aspect of vehicle operation, the operator may not be aware of or paid attention to the prior movement of, for example, another vehicle nearby the host-vehicle.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
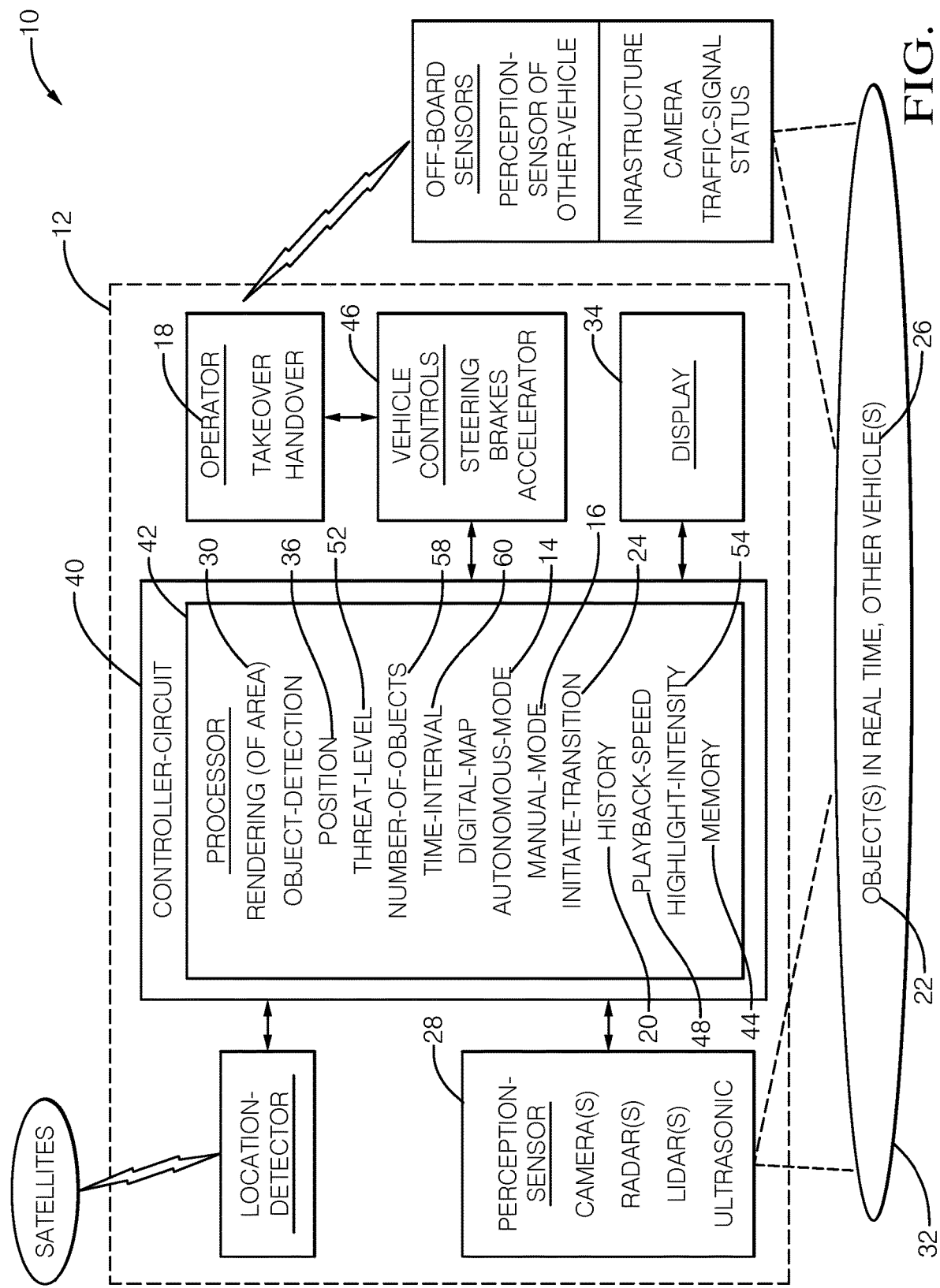
FIG. 1 is a diagram of a system for operating a host-vehicle in accordance with one embodiment.

FIG. 1 illustrates a non-limiting example of a system 10 for operating an automated vehicle, e.g. a host-vehicle 12. The host-vehicle 12 may be characterized as an automated vehicle. As used herein, the term automated vehicle may apply to instances when the host-vehicle 12 is being operated in an autonomous-mode 14, i.e. a fully automated or driverless mode, where an operator 18 of the host-vehicle 12 may do little more than designate a destination to operate the host-vehicle 12. However, full automation is not a full-time requirement. It is contemplated that the teachings presented herein are useful when the host-vehicle 12 is operated in a manual-mode 16 where the degree or level of automation may include, for example, manual steering, but all other aspects of operating the host-vehicle 12, e.g. braking/accelerating, maybe automated. Alternatively, the level of automation may be little more than providing an audible or visual warning to the human-operator who is generally in control of the steering, accelerator, and brakes of the host-vehicle 12.

As will be explained in more detail below, a feature of the system 10 is to playback to the operator 18 a history 20 of information regarding various instances of objects 22 (e.g. other vehicles, pedestrians, bicyclists, traffic-signals) around or proximate to the host-vehicle 12 when a transition 24 is initiated by way of a handover (the system 10 requests or requires that the operator 18 take control of the host-vehicle 12) or a takeover (the operator 18 performs some action to take control of one or more aspects of operating the host-vehicle 12) to change operation of the host-vehicle 12 from the autonomous-mode 14 to the manual-mode 16 described above. The history 20 is useful to the operator 18 around the time of the transition 24 as the operator 18 may not have been paying attention to traffic prior to the initiation of the transition. For example, the history 20 may show prior movement of an object 22 such as an other-vehicle 26 proximate to, e.g. behind, the host-vehicle 12. If the other-vehicle 26 is rapidly approaching the host-vehicle 12 from behind and/or swerving to make frequent lane changes, the operator 18 is better aware of the situation as the history 20 conveys this prior behavior. By being better informed about nearby objects, the operator 18 may, for example, advantageously decide to change lanes or remain in a present lane to avoid interfering or a collision with the other-vehicle 26.

The system 10 includes a perception-sensor 28 that is used by the system 10 to determine a rendering 30 of an area 32 proximate to (e.g. within 200 meters of) the host-vehicle 12. The perception-sensor 28 may include, but is not limited to, a camera, a radar, a lidar, an ultrasonic transducer, or any combination thereof mounted on-board the host-vehicle 12. In addition, the perception-sensor 28 may include, but is not limited to, any combination of those devices located off-board the host-vehicle, e.g. one or more devices mounted on the other-vehicle 26 and/or associated with infrastructure such as a traffic-camera located above a roadway 50 (FIG. 2) traveled by the host-vehicle 12. It is also contemplated that an infrastructure aspect of the perception-sensor 28 may include a means to indicate the status of, for example, a traffic-signal or a cross-walk signal. That is, the traffic-signal may be equipped to broadcast a status, for example that the red, yellow, or green signal light is illuminated. Any instance of a camera may be configured to output a still-image or a video-stream. Likewise, a radar may output a radar-map, and a lidar may output a point-cloud.

As used herein, the rendering 30 of the area 32 may be as simple as a copy of a video feed from single a camera (on-board or off-board), or as sophisticated as a 'birds-eye' view of the area 32 which may be synthesized from multiple video feeds from multiple cameras, on-board and/or off-board the host-vehicle 12. The rendering 30 may include further enhancements of video information by using a radar-map from a radar and/or a point-cloud from a lidar to emphasize selected instances of the objects 22 that appear or are otherwise indicated in the rendering 30.

The system 10 includes a display 34 such as a reconfigurable computer monitor or a general-purpose graphics type of display that is operable to convey to the operator 18 of the host-vehicle 12 a position 36, e.g. a relative-position relative to the host-vehicle 12, of one or more instances of objects 22 present in the area 32 and in accordance with the rendering 30. The display 34 may be part of the host-vehicle 12, i.e. permanently attached to the host-vehicle 12, or the display 34 may be a smart-phone or tablet that is provided by the operator 18 and can be taken away from the host-vehicle 12 for other uses when not being used as, for example, a general-purpose display that may be generally used for operating the host-vehicle 12.

The system 10 includes a controller-circuit 40 in communication with the perception-sensor 28 and the display 34. The communication may be by way of wires, optical-cable, or wireless communications as will be recognized by those in the art. Wireless communications would most likely be used for any off-board sensors, and there are known protocols for such communication such as BLUETOOTH®, Wi-Fi, dedicated-short-range-communications (DSRC), or cellular phone networks. The controller-circuit 40, hereafter sometimes referred to as the controller 40, may include one or more instances of a processor 42 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 40, it is recognized that the functions of the controller 40 may be shared or distributed among several instances of controllers that are each configured for some specific task. Hereafter, any reference to the controller 40 being configured for something is to also be interpreted as suggesting that the processor 42 may also be configured for the same thing. It is also recognized that there may be multiple instances of processors in any instance of the controller 40. The controller 40 may include memory 44, i.e. non-transitory computer-readable storage-medium, including non-volatile memory, such as electrically erasable programmable read-only memory (EEPROM) for storing one or more routines, thresholds, and captured data. The memory 44 may be part of the processor 42, or part of the controller 40, or separate from the controller 40 such as remote memory stored in the cloud. The one or more routines may be executed by the controller 40 or the processor 42 to perform steps for determining the rendering 30 and the history 20 based on signals received by the controller 40 from, but not limited to, the perception-sensor 28 as described herein.

As previously mentioned, the system 10 conveys to the operator 18 a history 20 of information regarding various instances of objects 22 around or proximate to the host-vehicle 12 when the transition 24 is initiated to change operation of the host-vehicle 12 from the autonomous-mode 14 to the manual-mode 16. That is, the history 20 is conveyed in response to initiating the transition 24 of operation of the host-vehicle 12 from the autonomous-mode 14 to a manual-mode 16. To this end, the controller-circuit 40 is configured (i.e. programmed) to operate the host-vehicle 12 in the autonomous-mode 14, i.e. operate the vehicle-controls 46 of the host-vehicle 12 to control, for example, the steering, brakes, and accelerator of the host-vehicle 12. When the transition 24 is initiated, the controller 40 then operates the display 34 to convey to the operator 18 the history 20 of the position of one or more instances of the objects 22 in accordance with the rendering 30.

The history 20 may be comparable to, but not limited to, an overhead (i.e. birds-eye) or perspective view (e.g. elevated) of the area 32, or an elevated perspective view of a selected portion of the area 32. The image-processing techniques and algorithms necessary to synthesize images with various perspectives from one or more cameras that have different perspectives that what is shown are known.

In order to more quickly inform the operator 18 about the position 36 of the one or more objects 22, a playback-speed 48 of the history 20 may be faster than the speed at which the events depicted in the history 20 actually occurred. That is, if the events depicted in the history 20 are characterized as having previously occurred or been previously recorded in real-time, and the history 20 when conveyed to the operator 18 is characterized by the playback-speed 48, then the playback-speed 48 may be advantageously faster than real-time. For example, if the playback-speed 48 is three times (3×) real-time, and the desire is for the history 20 to start three seconds before the transition 24 was initiated, and the history 20 continues at 3× until the history 20 catches up to the present time thereby showing any subsequent events after starting to convey the history 20, the total time need to convey the history is 4.5 seconds.

Figure 2:
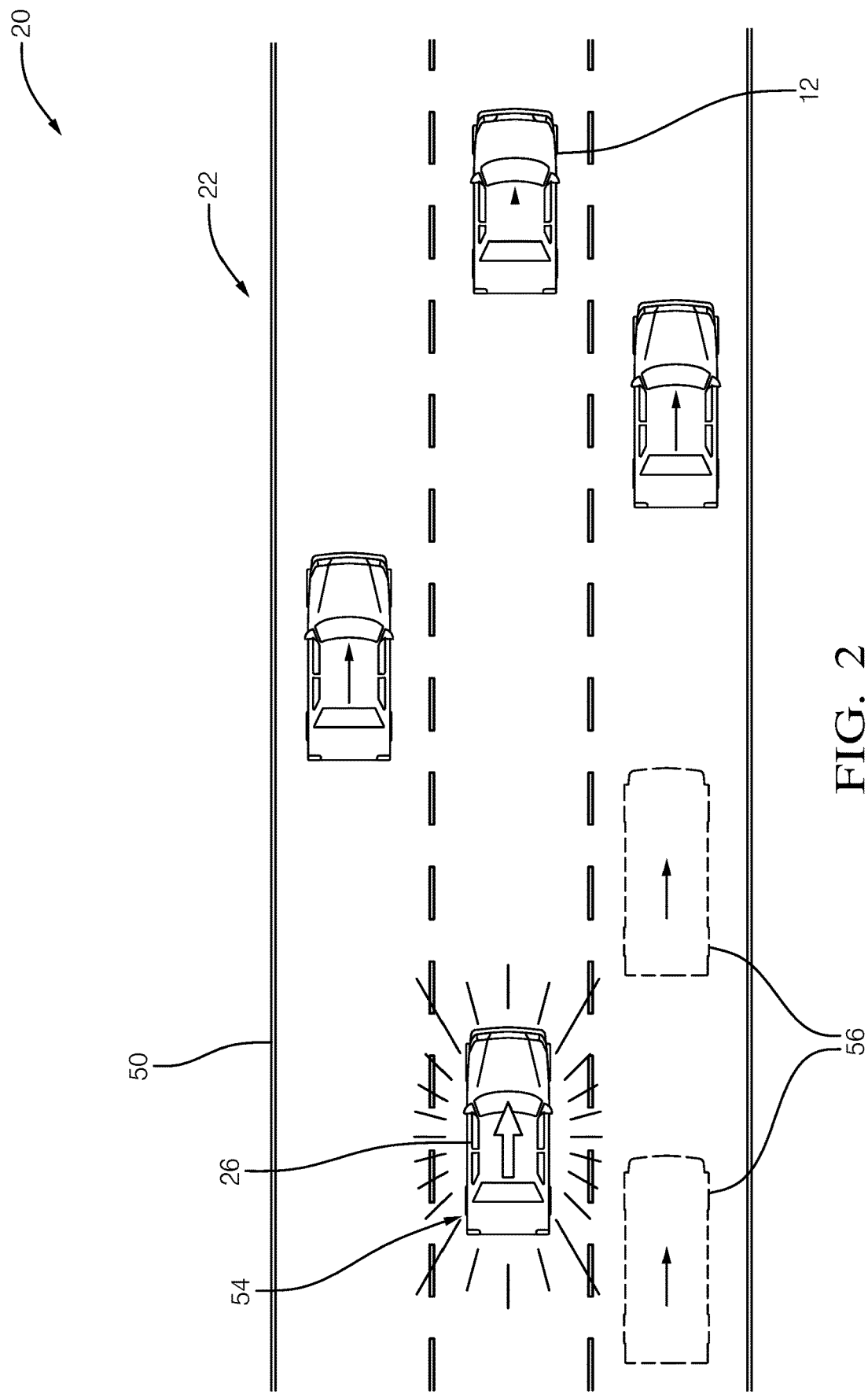
FIG. 2 is a history of traffic about the host-vehicle displayed by the system of FIG. 1 in accordance with one embodiment.

FIG. 2 illustrates one frame of video that is a non-limiting example of the history 20. The perspective suggests that a camera was positioned well above the roadway 50 traveled by the host-vehicle 12 and the various vehicles that are in this example indicated as the objects 22. This perspective could come from an infrastructure camera located above the roadway 50, or could be synthesized from images provided by one or more cameras on the host-vehicle 12 and/or the other various vehicles and/or other infrastructure cameras at locations that don't correspond to the perspective suggested by FIG. 2, as will be recognized by those in the art. As will be explained below by way of non-limiting examples, the history 20 may only show or depict selected instances of the objects 22 around the host-vehicle 12 rather than clearly or explicitly show every instance of the objects 22. The two vehicles in the right-hand lane well behind the host-vehicle 12 are examples of how the depiction of unimportant instances of the objects 22 may be blurred or ghosted. This is done so that the history 20 does not convey so much information that the operator 18 is confused with irrelevant information.

The controller 40 may also be configured to determine a threat-level 52 of the object 22, i.e. the threat-level 52 of one or more instances of the objects 22. For example, one instance of the objects 22 in FIG. 2 is the other-vehicle 26 which at the time the transition 24 is initiated is deemed operating in an erratic manner or traveling at a speed substantially greater than all the other vehicles on the roadway 50. Algorithms for tracking objects and identifying which objects may pose a threat to a vehicle, e.g. the host-vehicle 12, are known. Each of the objects 22 may be tracked and the threat-level 52 of each of the objects 22 may be updated on a periodic basis so that when the transition 24 is initiated, the controller 40 or the processor 42 can quickly determine the history 20 to be shown to the operator 18.

To draw the attention of the operator 18 to the instances of the objects 22 that are a threat, the history 20 shown on the display 34 may highlight a selected instance of the objects 22, e.g. the other-vehicle 26. The history 20 may alter the rendering 30 used for the history 20 by, but not limited to, altering the general color of the depiction of the other-vehicle 26, superimposing a shaded box around the depiction of the other-vehicle 26 shown in the history 20, flashing the depiction of the other-vehicle 26, or any combination thereof. The degree which an object is highlighted may be characterized by an intensity 54, i.e. a highlight-intensity 54. Contrariwise, the depiction of an instance of the object 22 may be de-emphasized, e.g. blurred or erased if the threat-level 52 is deemed to be relatively low, e.g. less than a threat-threshold, see for example the low-threat-objects 56.

Other examples of objects that may be highlighted in the history 20 that are not depicted in FIG. 2 include, but are not limited to, objects moving in a direction that intersects a forward-path of the host-vehicle 12, objects that are characterized by a time to potential impact less than a time-threshold, objects that are characterized by a probability of impact greater than a probability threshold, and/or a relative-speed, actual-speed, or over-speed (speed over posted speed-limit) greater than a speed-threshold. Other examples of objects that may be highlighted in the history 20 include, but are not limited to, a vehicle pulled up into a position to enter the roadway from a driveway, intersecting road, or parking lot; or objects that are classified as likely to be periodically moving in and out of traffic flow, e.g. a mail truck, a garbage truck, etc.; and/or a recently change traffic signal or cross-walk signal and/or static obstructing objects on the road, e.g. fallen equipment from maintenance truck, boxes etc.

It is also contemplated that the number of objects highlighted may be varied based on time-to-takeover. To this end, the controller-circuit 40 may be configured to operate the display 34 to convey the positions 36 of a plurality of objects 22. The plurality of objects 22 may be characterized by a number-of-objects 58, and how many of the number-of-objects 58 that are to be highlighted may be determined in accordance with or based on a time-interval 60 from initiating the transition 24 and to when the manual-mode 16 is required. For example, if the time-interval is relatively short, e.g. three seconds, then only one or two objects with the highest threat-level may be highlighted. By contrast, if the time-interval is relatively long, e.g. fifteen seconds, then more objects may be highlighted, e.g. every object with a threat-level greater than a threat-threshold may be highlighted. As above, the intent is to decrease the complexity of the history 20 as the time-interval 60 to full manual is shortened so operator 18 is not overwhelmed with information.

Figure 3:
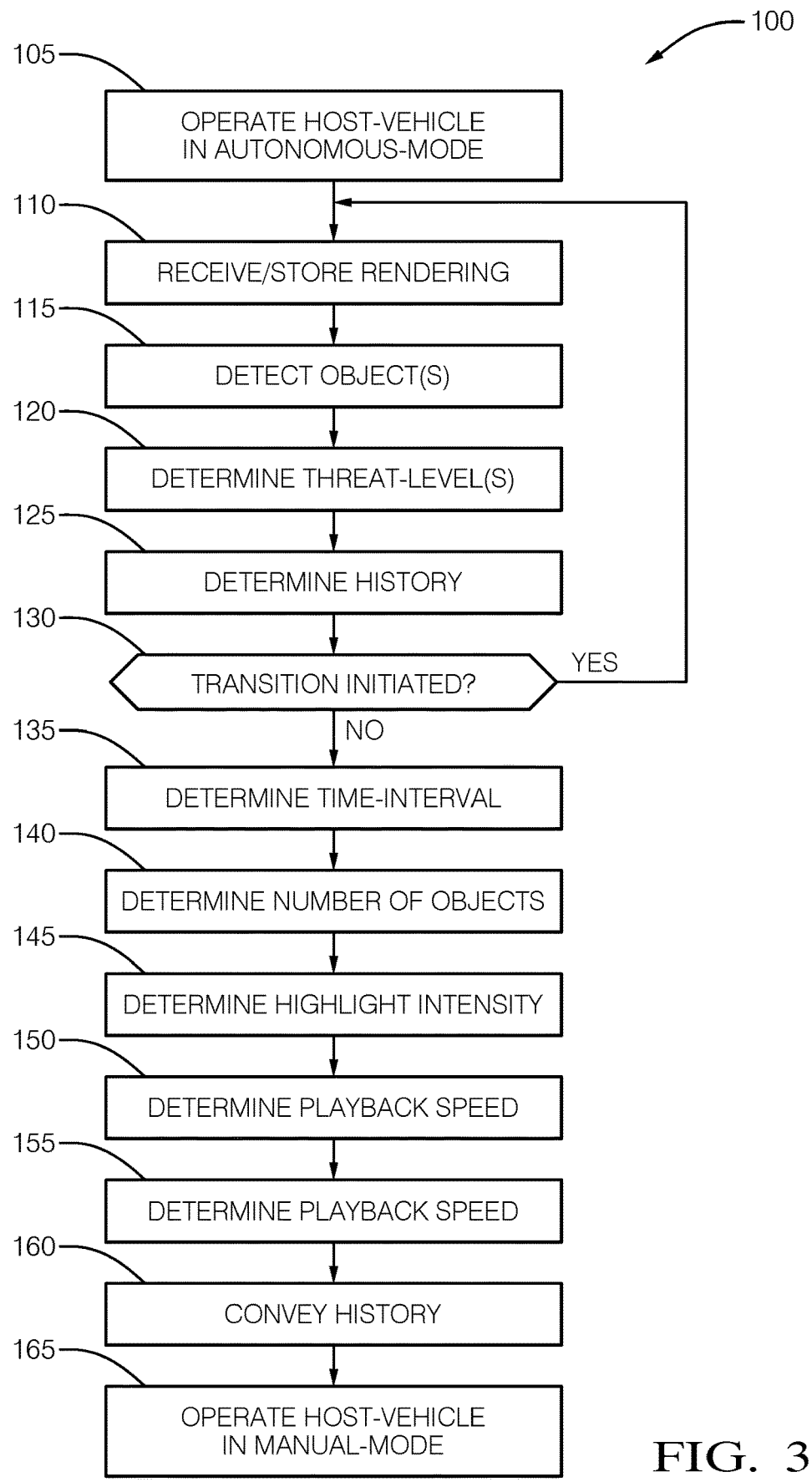
FIG. 3 is method of operating the system of FIG. 1 in accordance with one embodiment.

FIG. 3 is a non-limiting example of a method 100 of operating the system 10.

Step 105, OPERATE HOST-VEHICLE IN AUTONOMOUS-MODE, may include operating the host-vehicle 12 in the autonomous-mode 14 by the operator 18 entering a destination, and the controller 40 or processor 42 performing all operations to control the host-vehicle 12. The operations may include, but are not limited to, the identification and tracking of the objects 22 (other-vehicles, lane-markings, stationary-objects, etc.) proximate to the host-vehicle 12, determining a location of the host-vehicle 12 on a digital-map based on signals received from global-positioning-system (GPS) satellites that were processed by a location-device, e.g. a GPS receiver, and operating the steering, brakes, and accelerator of the vehicle-controls 46 to control the speed and heading of the host-vehicle 12.

Step 110, RECEIVE/STORE RENDERING, may include receiving from a perception-sensor 28 a rendering (e.g. video from a camera, radar-map from a radar, point-cloud from a lidar, or any combination thereof) of an area 32 proximate to the host-vehicle 12. The rendering 30 may be stored in the memory 44, and the storing of the most recent information from the rendering 30 may displace relatively old information, e.g. information from greater than twenty-five seconds prior to the present time.

Step 115, DETECT OBJECT(S), may include noting which of the objects 22 in the rendering 30 is closer than a distance-threshold, and adding to the record stored in the memory 44 distance to target information for each instance of the objects 22 is closer than the distance-threshold.

Step 120, DETERMINE THREAT-LEVEL(S), may include determining a threat-level 52 of various instance of the objects 22 based on, but not limited to, a closing-rate (e.g. how fast the other-vehicle 26 is approaching the host-vehicle), a time-to-collision (e.g. how much time until the host-vehicle 12 and an instance of the objects 22 collides if no remedial action is taken), or travel-path-proximity (how close is an instance of the objects 22 to the predicted travel-path of the host-vehicle 12). A threat-level 52 of zero or less than 0.1 indicates that an instance of the objects 22 presents little or no threat to the host-vehicle 12, while a threat-level of 0.9 or 1 indicates that an instance of the objects 22 presents a substantial threat and/or that a collision is almost certain.

Step 125, DETERMINE HISTORY, may include determining the history 20 of a position 36 of an object 22 present in the area 32, which may include tracking a vehicle that may not register with a high value of the threat-level 52, but is behaving in an erratic manner (e.g. frequent/rapid lane changes) so that vehicle may become a substantial threat at some time in the future. Determining the history 20 may also include determining how far back in time it is desirable that the history 20 of the rendering should be stored.

Step 130, TRANSITION INITIATED?, may include initiating a transition 24 of operation of the host-vehicle 12 from the autonomous-mode 14 to a manual-mode 16 by the operator 18 or the controller 40. The operator 18 may suddenly decide, for example, to exit an expressway to stop at a rest-area (not shown). Rather than taking the time to enter the rest-area as a new destination or a way-point, the operator 18 may physically override the automated steering of the host-vehicle 12 by turning a hand-wheel of the host-vehicle 12 to steer the host-vehicle 12 toward the rest-area. As another example, the controller 40 may decide that manual control of the host-vehicle 12 is necessary because, for example, the perception-sensor 28 is not operating properly, or there is an accident-site ahead and the controller 40 does not have high confidence about navigating around the accident-site.

Step 135, DETERMINE TIME-INTERVAL, may include the controller 40 determining how much time is available from the instant the transition 24 is initiated until the operator 18 must be fully prepared to take control of the host-vehicle 12 in the manual-mode 16. The time-interval 60 may generally corresponds to how much time there is to convey the history 20.

Step 140, DETERMINE NUMBER-OF-OBJECTS, may include detecting and/or determining positions of a plurality of objects that are to be displayed in the history 20. The plurality of objects may be characterized by a number-of-objects 58, where the number-of-objects 58 indicates how many of the objects 22 are to be highlighted or otherwise emphasized to attract the attention of the operator 18. The number-of-objects 58 may also be determined in accordance with the time-interval 60. If the time-interval 60 is relatively short, e.g. three seconds, the number-of-objects 58 that are highlighted may be only one or two so the operator 18 is not overwhelmed with information. However, if the time-interval 60 is relatively large, fifteen seconds for example, then more of the objects 22 may be highlighted in the history as the operator 18 has more time to contemplate the history 20.

Step 145, DETERMINE HIGHLIGHT-INTENSITY, may include highlighting the object in the history 20. The highlighting of the object may be characterized by an intensity 54 or a highlight-intensity 54. In one embodiment, the intensity 54 may be determined in accordance with the threat-level 52 of the object 22. For example, if the threat-level 52 is relatively high, the highlighting may include coloring the object bright red, or adding a bounding box around the object in the history 20 shown on the display 34. The bounding box may be colored based on the threat level where, for example, red is a high-threat, orange is a medium threat, yellow is a low-threat, and no boarder means the object is little or no threat.

Step 150, DETERMINE PLAYBACK-SPEED, may include increasing the speed at which the history conveys events depicted in the history relative to normal-time or real-time. That is, the events are characterized as having occurred in real-time, and the history 20 may be characterized by a playback-speed 48 that is faster than real-time, e.g. two or three times real time.

Step 155, CONVEY HISTORY, may include, in response to detecting the initiating of the transition 24, conveying to the operator 18 of the host-vehicle 12 the history of the position of the object 22 in accordance with the rendering 30.

Step 160, OPERATE HOST-VEHICLE IN MANUAL-MODE, may include the controller 40 releasing control to the operator 18 all of some of the vehicle-controls 46.

Described herein is a first device 40 that includes one or more processors 42; memory 44; and one or more programs 105-160 stored in memory 44, the one or more programs 105-160 including instructions for performing all or part of the method 100. Also, described herein is a non-transitory computer-readable storage-medium 44 comprising one or more programs 105-160 for execution by one or more processors 42 of a first device 40, the one or more programs 105-160 including instructions which, when executed by the one or more processors 42, cause the first device to perform all or part of the method 100.

Accordingly, a system 10, a controller 40 for the system 10, and a method 100 of operating the system 10 are provided. A history 20 is provided so an operator can quickly learn about prior activity about the host-vehicle 12 that the operator 18 is about to operate in the manual-mode 16

While this invention has been described in terms of the preferred embodiments thereof, it is not intended to be so limited, but rather only to the extent set forth in the claims that follow.

We claim:

1. A system for operating an automated vehicle, said system comprising:
   a perception-sensor used to determine a rendering of an area proximate to a host-vehicle;
   a display operable to convey to an operator of the host-vehicle a position of an object present in the area in accordance with the rendering; and
   a controller-circuit in communication with the perception-sensor and the display, said controller-circuit configured to operate the host-vehicle in an autonomous-mode, and operate the display to convey to the operator a history of the position of the object in accordance with the rendering, said history conveyed in response to initiating a transition of operation of the host-vehicle from the autonomous-mode to a manual-mode.

2. The system in accordance with claim 1, wherein events depicted in the history are characterized as having occurred in real-time, and the history is characterized by a playback-speed, said playback-speed faster than real-time.

3. The system in accordance with claim 1, wherein the controller-circuit is configured to determine a threat-level of the object, and highlight the object in the history, said highlight of the object characterized by an intensity, said intensity determined in accordance with the threat-level of the object.

4. The system in accordance with claim 3, wherein the controller-circuit is configured to operate the display to convey positions of a plurality of objects, said plurality of objects characterized by a number-of-objects, wherein the number-of-objects highlighted is determined in accordance with a time-interval from initiating the transition and to when the manual-mode is required.

5. A controller-circuit for operating an automated vehicle, said system comprising:
   an input configured to communicate with a perception-sensor used to determine a rendering of an area proximate to a host-vehicle;
   an output configured to communicate with a display operable to convey to an operator of the host-vehicle a position of an object present in the area in accordance with the rendering; and
   a processor in communication with the perception-sensor and the display, said processor configured to operate the host-vehicle in an autonomous-mode, and operate the display to convey to the operator a history of the position of the object in accordance with the rendering, said history conveyed in response to initiating a transition of operation of the host-vehicle from the autonomous-mode to a manual-mode.

6. The controller-circuit in accordance with claim 5, wherein events depicted in the history are characterized as having occurred in real-time, and the history is characterized by a playback-speed, said playback-speed faster than real-time.

7. The controller-circuit in accordance with claim 5, wherein the processor is configured to determine a threat-level of the object, and highlight the object in the history, said highlight of the object characterized by an intensity, said intensity determined in accordance with the threat-level of the object.

8. The controller-circuit in accordance with claim 7, wherein the processor is configured to operate the display to convey positions of a plurality of objects, said plurality of objects characterized by a number-of-objects, wherein the number-of-objects highlighted is determined in accordance with a time-interval from initiating the transition and to when the manual-mode is required.

9. A method for operating an automated vehicle, said method comprising:
   receiving from a perception-sensor a rendering of an area proximate to a host-vehicle;
   operating the host-vehicle in an autonomous-mode;
   determining a history of a position of an object present in the area;
   initiating a transition of operation of the host-vehicle from the autonomous-mode to a manual-mode; and
   in response to initiating the transition, conveying to an operator of the host-vehicle the history of the position of the object in accordance with the rendering.

10. The method in accordance with claim 9, wherein events depicted in the history are characterized as having occurred in real-time, and the history is characterized by a playback-speed, said playback-speed faster than real-time.

11. The method in accordance with claim 9, wherein the method includes determining a threat-level of the object; and
   highlighting the object in the history, said highlighting of the object characterized by an intensity, said intensity determined in accordance with the threat-level of the object.

12. The method in accordance with claim 11, wherein the method includes
   determining positions of a plurality of objects, said plurality of objects characterized by a number-of-objects, wherein the number-of-objects highlighted is determined in accordance with a time-interval from initiating the transition and to when the manual-mode is required.

* * * * *